United States Patent [19]

Wattonville

[11] Patent Number: 5,707,170
[45] Date of Patent: Jan. 13, 1998

[54] CONNECTOR FOR AGRICULTURAL TUBES AND TOOLBARS

[75] Inventor: Jason Daniel Wattonville, Maxwell, Iowa

[73] Assignee: Deere & Company, Moline, Ill.

[21] Appl. No.: 705,102

[22] Filed: Aug. 28, 1996

[51] Int. Cl.[6] .................. F16B 2/00; A01B 59/00
[52] U.S. Cl. .............. 403/391; 403/396; 403/399;
248/229.24; 172/451; 172/219
[58] Field of Search .................... 403/391, 389,
403/385, 396, 398, 399; 256/68, 69; 248/229.24,
231.61, 74.4; 172/451, 219, 271

[56] References Cited

U.S. PATENT DOCUMENTS

| | | | |
|---|---|---|---|
| 3,077,231 | 2/1963 | Hamilton | 172/421 |
| 3,403,737 | 10/1968 | Byrd | 172/451 X |
| 3,732,932 | 5/1973 | Taube | 172/7 |
| 3,734,201 | 5/1973 | Zaun | 172/551 |
| 4,142,588 | 3/1979 | Doss | 172/190 |
| 4,736,921 | 4/1988 | Zane et al. | 248/229.24 X |
| 4,865,132 | 9/1989 | Moore, Jr. | 172/196 |
| 5,000,267 | 3/1991 | Harrell | 172/271 X |
| 5,024,281 | 6/1991 | Furlough | 172/219 |
| 5,154,239 | 10/1992 | Harrell et al. | 172/219 X |
| 5,267,618 | 12/1993 | Harrell | 172/219 |

*Primary Examiner*—Kenneth J. Dorner
*Assistant Examiner*—William L. Miller

[57] ABSTRACT

Tube bracket structure for a toolbar includes a pair of identical bracket halves connected by bolts to positively grip first and second fore-and-aft spaced tubes. The bracket halves include angles with horizontal flanges which embrace the top and bottom of the tubes and project forwardly of the front tube and rearwardly of the aft tube. Upright flanges project vertically above and below the tubes and mount tube gripping portions having short projections which engage the tubes near the tube corners to positively hold the tubes in fixed offset and parallel relationship relative to each other. The projections are shaped for positive gripping despite variations in tube sizes. The bracket structure is repositionable along the tubes to avoid interference with tool mounts and accommodate virtually any desired tool spacing.

19 Claims, 3 Drawing Sheets

CONNECTOR FOR AGRICULTURAL TUBES AND TOOLBARS

BACKGROUND OF THE INVENTION

1) Field of the Invention

The present invention relates generally to brackets for use with agricultural toolbars and tubes, and, more specifically, to bracket structure for firmly connecting toolbars or tubes together in generally parallel relationship.

2) Related Art

Agricultural toolbar assemblies often include a dual tube construction with a forward hitch tube connected to hitch structure such as a three point hitch and at least one aft tube connected to the hitch tube and supporting ground engaging tools. The hitch tube can be permanently attached to the aft tube, but such construction often results in interference between the connecting portion and the tool mount and limits the ability to space the tools at the desired location along the aft tube.

Various bolted angle arrangements have been proposed to connect tubes, including pairs of angles with capscrews which surround and trap the tubes. Often these types of connections require numerous parts, are hard to connect and adjust, do not accommodate manufacturing variances and do not positively clamp the tubes. In some assemblies, the tube actually has to deflect some distance because of hole clearance, tube deflection caused by welding, or the like, resulting in ineffective load transfer between tubes and very high stresses on the toolbar assembly. Some of the angle arrangements also require excessively long bolts if the bolts are connected between the tubes to take up any looseness in the fore-and-aft direction. The fore-and-aft bolts are often unable to prevent joint separation under the extreme loads encountered by an agricultural implement.

Diamond style clamps are also used to clamp tubes, but require one of the tubes to be rotated so the tube walls are at 45 degree angles relative to the horizontal and vertical. The necessary tube rotation causes problems if additional parts need to be connected to the rotated tube since most attachments are designed for tubes having vertical faces and horizontal upper and lower walls. Diamond style clamps also require more parts and more room for installation than other types of clamps.

BRIEF SUMMARY OF THE INVENTION

It is therefore an object of the present invention to provide an improved tube bracket structure for an agricultural implement. It is a further object to provide such a structure which overcomes most or all of the aforementioned problems.

It is a further object of the invention to provide an improved tube bracket structure for connecting two tubes of an agricultural implement, wherein the bracket structure is simple in construction and has few parts. It is still another object to provide such a structure which does not compromise the ability to space tools at any location along the tube.

It is a further object of the invention to provide an improved tube bracket structure for connecting two tubes which positively clamps the tubes to prevent any looseness in the resulting connection and improve load transfer between the tubes. It is another object to provide such structure which accommodates manufacturing variances in the tubes without deteriorating of the load transfer between tubes. It is still a further object to provide such a structure which virtually eliminates joints that can separate and maintains a preselected tube spacing regardless of manufacturing variances.

It is a still another object of the invention to provide an improved tube bracket structure for connecting two tubes which does not require long bolts extending between the tubes and which supports the tubes in parallel relationship with the top and bottom walls of the tubes parallel to the ground.

In accordance with the above objects, tube bracket structure for a toolbar includes a pair of identical bracket halves connected by bolts to positively grip first and second fore-and-aft spaced tubes. The bracket halves include angles with horizontal flanges which embrace the top and bottom of the tubes and project forwardly of the front tube and rearwardly of the aft tube. Upright flanges project vertically above and below the tubes and mount tube gripping portions having short projections which engage the tubes near the tube corners to positively hold the tubes in fixed relationship relative to each other. The projections are shaped for positive gripping despite variations in tube sizes caused by manufacturing tolerances.

The tube bracket structure positively grips both tubes so that loads are immediately transferred between the tubes, thereby eliminating severe stresses caused by connector looseness and tube deflection. The projections assure correct tube spacing without joint separation and tight gripping regardless of variations such as caused by manufacturing tolerances. The bracket structure can be easily moved along the tubes to avoid any interference between the structure and tool mounts and enhance adjustability of the tools along the tube. The tubes can be closely connected while retaining the ability to move the tool mounts. Using identical bracket halves reduces the number of parts required to fabricate the bracket structure and simplifies and reduces manufacturing costs.

DETAILED DESCRIPTION OF THE PREFERRED EMBODIMENT

Figure 1:
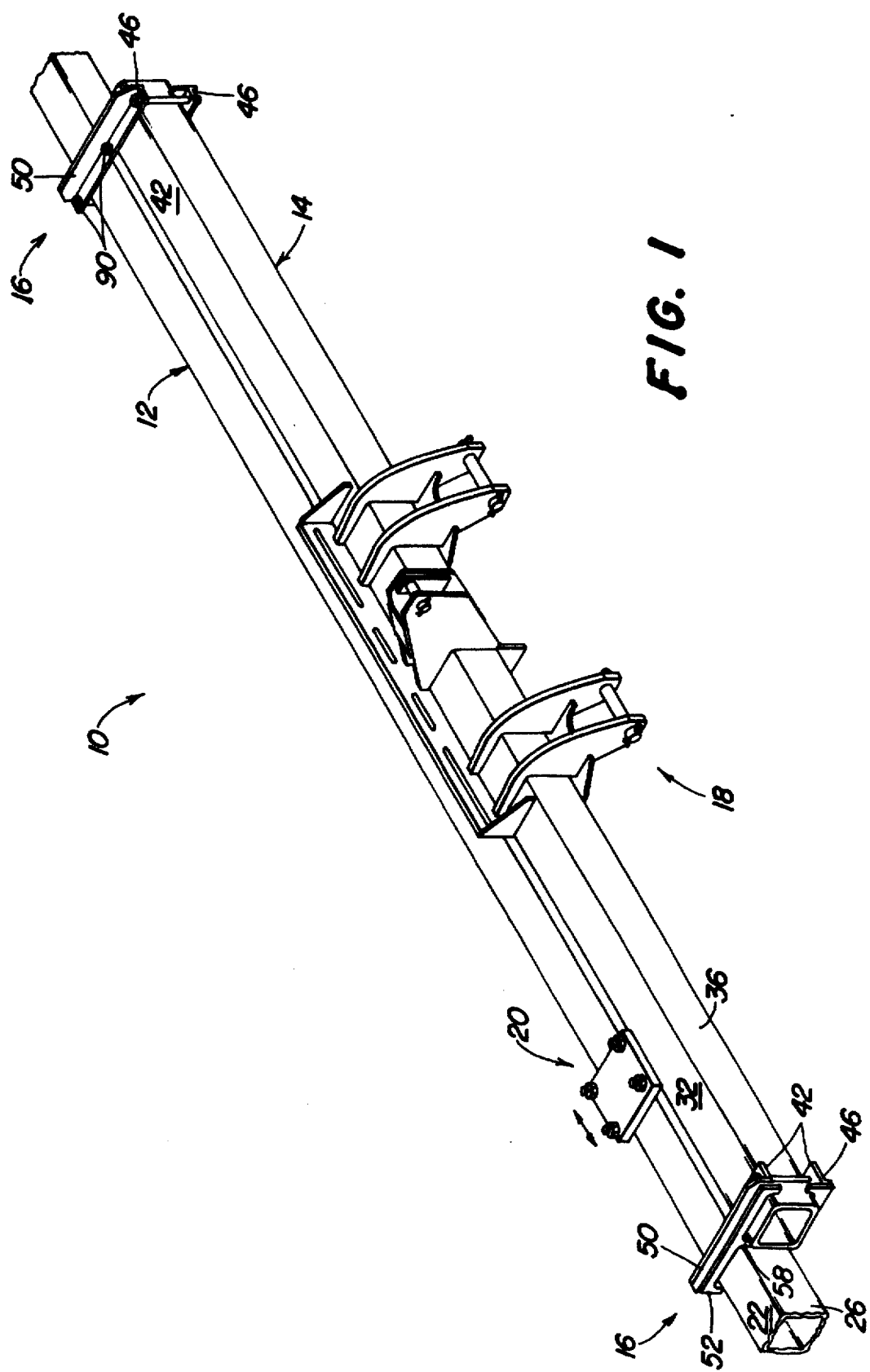
FIG. 1 is an exploded rear perspective view of a portion of a toolbar assembly including tube bracket structure constructed in accordance with the teachings of the present invention.
Figure 2:
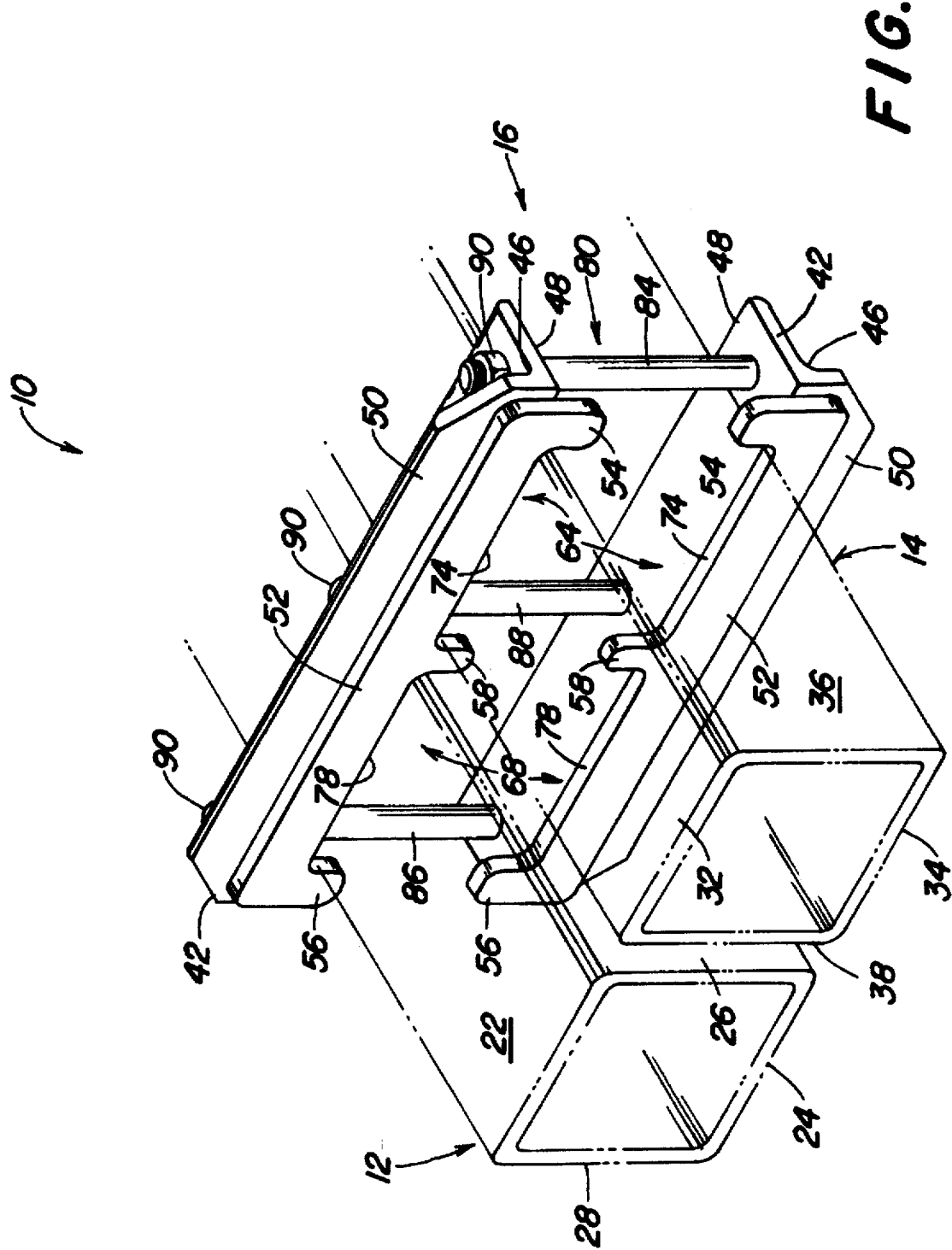
FIG. 2 is an enlarged perspective view of the tube bracket structure.
Figure 3:
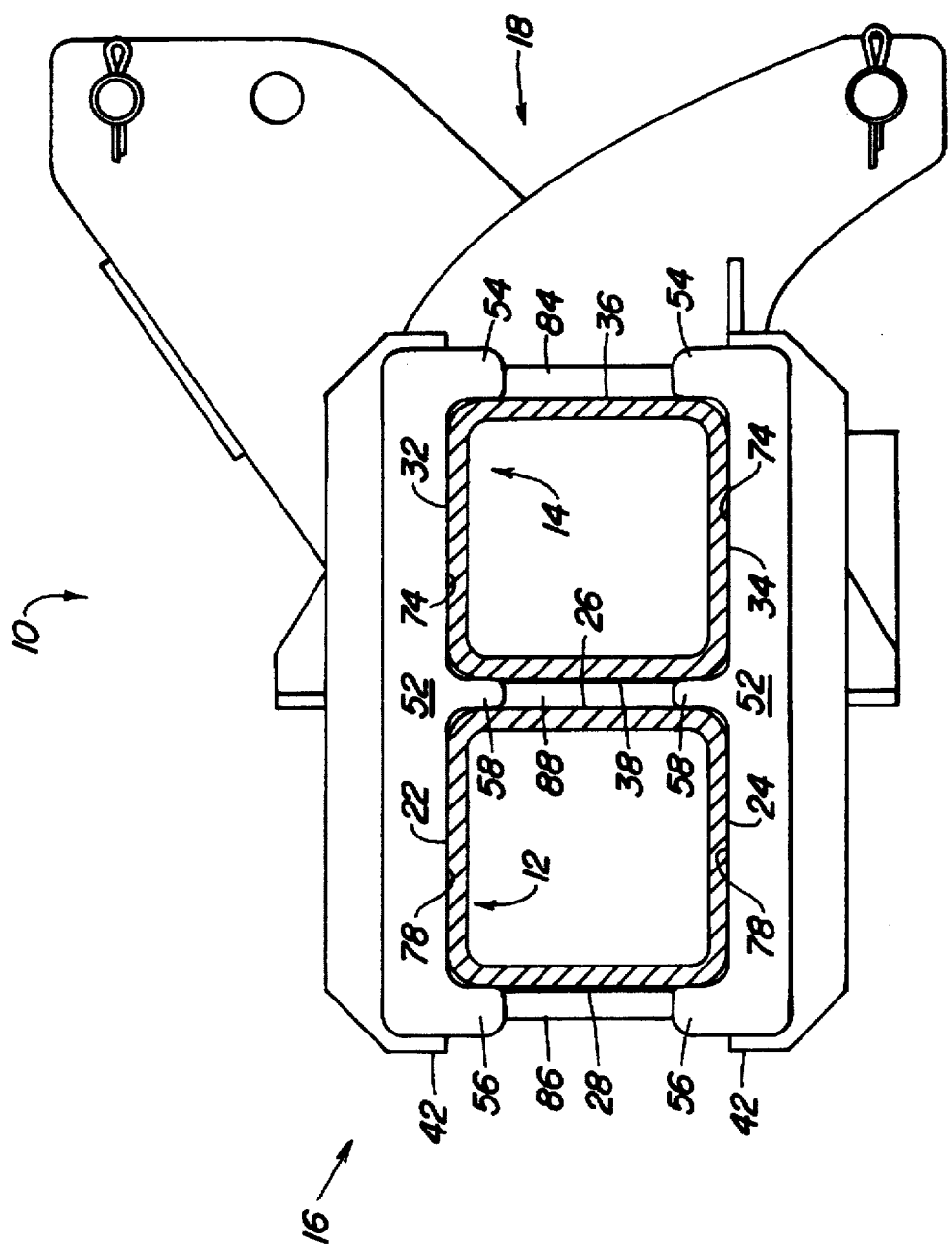
FIG. 3 is an enlarged side view, partially in section, of the toolbar assembly shown in FIG. 1.

Referring to FIGS. 1–3, therein is shown a toolbar assembly indicated generally at 10. The toolbar assembly 10 includes a first tube or main toolbar 12 connected rearwardly of a second tube or hitch tube 14 by tube bracket structure 16. A three point hitch structure, indicated generally at 18 in FIGS. 1 and 3, connects the toolbar assembly 10 to tractor (not shown) or other vehicle for forward movement across a field. A bracket 20, carried by and transversely adjustable with respect to the main toolbar 12, supports various types of earthworking tools (not shown), such as ripper or similar subsoiler tools, which heavily load and torque the toolbar during field operations.

The tubes 12 and 14 are rectangular in cross section and are supported in fixed parallel relationship to each other by the bracket structure 16. The first tube 12 includes top and bottom walls 22 and 24 and forward and aft faces 26 and 28 with corresponding rounded corners connecting the walls. The second tube 14, which as shown has the same cross sectional dimensions as the first tube 12, includes top and bottom walls 32 and 34 and forward and aft faces 36 and 38.

The bracket structure 16 includes upper and lower, generally identical bracket sections 42, each including an angle 46 with an apertured horizontal flange 48 and a vertical flange 50. Connected to each vertical flange 50 is a planar, fore-and-aft extending tube gripping member 52 with forward, aft and central vertical projections 54, 56 and 58, respectively, which have a rounded or similar camming shape to provide a wedging action against the tube corners when forced over the tubes 12 and 14. As best seen in FIGS. 2 and 3, the projections extend snugly around the corners of the tubes 12 and 14 and project a short distance against the tube faces to provide an interference fit over the tubes and positively space the tubes in the fore-and-aft direction and maintain the tubes parallel to each other. As shown, the projections 54, 56 and 58 have a projecting length substantially less than half the height of the tubes 12 and 14, and the central projections 58 have a fore-and-aft dimension (FIG. 3) approximately equal to the desired spacing between the adjacent faces 26 and 38 of the tubes 12 and 14.

As best seen in FIG. 2, the projections are defined in part by notches 64 and 68 in the planar members 52. The notches 64 and 68 have innermost edges 74 and 78 which align with the horizontal flanges 48 and engage the top walls 22 and 32 and the bottom walls 24 and 34 with the horizontal flanges 48.

Bolt structure indicated generally at 80 in FIG. 2 extends through the apertures in the flanges 48 to firmly clamp the bracket structure 16 to the tubes 12 and 14. The structure 80 includes a front bolt 84 adjacent the projections 54, a rear bolt 86 adjacent the projections 56 and a central bolt 88 adjacent the central projections 58. Nuts 90 are threaded onto the bolt ends to firmly secure the flanges 48 and edges 74 and 78 against the top and bottom walls 22,24 and 32,34.

Preferably each of the projections 58 has an effective fore-and-aft dimension approximately equal to but slightly larger than the diameter of the bolt 88 so that the projections 58 define a preselected spacing between the tubes 12 and 14. In addition, the inside faces of the projections 54 and 56, rather than the bolts 84 and 86, define the spacing between the forward face 36 of the tube 14 and the aft face 28 of the tube 12. By providing the members 52 with wedging projections and an interference fit on the tubes and reducing or eliminating reliance on the bolts for tube spacing, looseness caused by such factors as oversized holes and bolt tolerances or the like is overcome, and load transfer between the tubes 12 and 14 is immediate and predictable. Severe stresses caused by connector looseness, tube deflection and the like are eliminated.

The spacing between the tubes 12 and 14 accommodates the bolts of the tool mounting bracket 20 and permits the bracket, bracket bolts and attached tool to be moved to substantially any location along the tube 12 without interference. If the bracket structure 16 is at a location that would interfere with the desired location of the tool mounting bracket 20, the operator first loosens the bolts 84, 86 and 88 and drives the upper and lower bracket sections 42 from the tubes 12 and 14. The bracket structure 16 is then slid along the tubes to a non-interfering location. The projections 54, 56 and 58 are then wedged against the tubes near the corners and the bolts 84, 86 and 88 are tightened to secure the flanges 48 and edges 74 and 78 against the top and bottom walls of the tubes.

Having described the preferred embodiment, it will become apparent that various modifications can be made without departing from the scope of the invention as defined in the accompanying claims.

I claim:

1. Toolbar structure for an implement adapted for movement over the ground in a forward direction, the toolbar structure including first and second tubes of rectangular cross section, each tube having opposed top and bottom faces spaced a preselected distance apart and opposite front and rear sides defining upper and lower pairs of tube corners, a bracket structure connecting the first and second tubes in generally parallel and offset relationship with the first tube behind the second tube and, when in use, with the top and bottom faces generally parallel to the ground, the bracket structure comprising:

top and bottom angles having horizontal flanges embracing, respectively, the top and bottom faces of the first tube, the angles also including first and second upright flanges projecting in opposite vertical directions from the faces;

first and second tube gripping members fixed to the first and second upright flanges, respectively, and projecting vertically along portions of the opposite sides towards the opposite faces, the tube gripping members embracing the first and second tubes adjacent the tube corners and including a central upright member spacing the tubes the preselected distance; and a bolt structure selectively clamping and unclamping the horizontal flanges against the top and bottom faces and maintaining the tube gripping members against the tubes.

2. The toolbar structure as set forth in claim 1 wherein the bolt structure comprises a central bolt extending through the horizontal flanges adjacent the central member, the central bolt located between the first and second tubes and having a diameter no greater than the preselected distance, and wherein the bracket structure is moveable along the first and second tubes when the bolt structure is unclamped.

3. The toolbar structure as set forth in claim 1 wherein the central member of the tube gripping members comprises a projection having a shaped end for wedging between adjacent said corners of the first and second tubes and positively positioning the tubes relative to each other as the horizontal flanges are moved against the faces.

4. The toolbar structure as set forth in claim 1 wherein the tube gripping members are substantially planar and lie substantially on an imaginary plane perpendicular to the faces of the first and second tubes.

5. The toolbar structure as set forth in claim 2 wherein the bolt structure further includes a rear bolt adjacent the rear side of the first tube and a forward bolt located adjacent the front side of the second tube, and wherein the tube gripping members provide substantially all fore-and-aft support between the first and second tubes to maintain the parallel and offset relationship of the tubes.

6. The toolbar structure as set forth in claim 5 wherein the tube gripping members comprise finger-like projections having rounded ends for wedging against the corners of the first and second tubes when the horizontal flanges are moved against the faces.

7. The toolbar structure as set forth in claim 6 wherein the tube gripping members comprise notched plates attached to the upright flanges.

8. The toolbar structure as set forth in claim 7 wherein the notched plates include first and second notches conforming generally to the shapes of the first and second tubes and having edges defining extensions of the horizontal flanges in a direction, when in use, transverse to the forward direction.

9. The toolbar structure as set forth in claim 7 wherein the notched plates include front and rear notches defining the central member, and wherein the central member has a vertical length substantially less than half the distance between the tube faces.

10. Toolbar structure including a hitch tube and an earthworking tool supporting toolbar, a tube bracket structure connecting the toolbar in parallel offset relationship to the hitch tube, the toolbar and hitch tube having generally rectangular cross sections with top and bottom walls and front and rear faces, the tube bracket structure including:

first and second bracket halves including horizontal portions embracing the top and bottom walls, respectively, of the toolbar and hitch tube, and planar tube gripping portions including forward, central and aft upright planar projections and extending perpendicularly from the horizontal portions along the front and rear faces, the planar tube gripping portions providing an interference fit against the toolbar and hitch tube and spacing and maintaining the toolbar and hitch tube a preselected distance apart with, when in use, the top and bottom walls in a horizontal attitude; and a bolt structure extending vertically between the bracket halves and tightenable against the horizontal portions for maintaining the tube gripping portions securely against the toolbar and hitch tube during field working operations with the tube gripping portions transferring loading between the toolbar and hitch tube.

11. The toolbar structure as set forth in claim 10 wherein the bolt structure includes a bolt of preselected diameter, wherein the preselected diameter of the bolt is less than the preselected distance that the toolbar and hitch tube are spaced apart so that the spacing between the tube and toolbar is determined substantially independently of the bolt.

12. The toolbar structure as set forth in claim 10 wherein the bracket halves include first and second angles with upright flanges and with horizontal flanges which define the horizontal portions, and wherein the tube gripping portions are fixed to the upright flanges.

13. The toolbar structure as set forth in claim 12 wherein the tube gripping portions are notched to define the forward, central and aft projections in the form of finger-like projections which provide the interference fit.

14. The toolbar structure as set forth in claim 13 wherein the finger-like projections include end portions providing a wedging action against the toolbar and hitch tube when the bracket halves are positioned on the toolbar and hitch tube.

15. The toolbar structure as set forth in claim 13 wherein the toolbar and hitch tube include corners and the projections engage the toolbar and hitch tube near the corners to positively hold the toolbar and hitch tube in the parallel offset relationship relative to each other.

16. The toolbar structure as set forth in claim 15 wherein the projections have a length substantially less than half the height of the front and rear faces.

17. The toolbar structure as set forth in claim 10 wherein the bolt structure is releasable to facilitate relocation of the bracket structure along the toolbar and hitch tube for accommodating desired spacing of the earthworking tools at substantially any location along the toolbar.

18. The toolbar structure as set forth in claim 17 wherein the earthworking tool includes a tool support with bolts slidable transversely between the toolbar and hitch tube.

19. The toolbar structure as set forth in claim 18 wherein the forward, central and aft projections of the tube gripping portions are in the form of finger-like projections extending between and spacing the toolbar and hitch tube.

* * * * *